United States Patent [19]
Young et al.

[11] Patent Number: 6,150,780
[45] Date of Patent: *Nov. 21, 2000

[54] AC MOTORIZED WHEEL CONTROL SYSTEM

[75] Inventors: Henry Todd Young, North East; Frederick Gaylord Beach, Erie, both of Pa.; James Price Roman, Nashotah, Wis.

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/191,778

[22] Filed: Nov. 13, 1998

Related U.S. Application Data

[62] Division of application No. 08/923,484, Sep. 4, 1997.

[51] Int. Cl.⁷ .................................................... H02P 1/00
[52] U.S. Cl. .................... 318/270; 318/274; 318/436; 318/369; 477/186; 701/22
[58] Field of Search ............................. 318/2, 3, 9, 139, 318/268–279, 430, 431, 436, 369, 372–374, 375; 477/182–187, 194, 195, 197, 199, 209, 210; 701/70, 22

[56] References Cited

U.S. PATENT DOCUMENTS

| | | |
|---|---|---|
| 3,787,723 | 1/1974 | Magnuson et al. . |
| 3,886,417 | 5/1975 | Niwa . |
| 4,056,759 | 11/1977 | Mitsui et al. . |
| 4,281,276 | 7/1981 | Cutler et al. . |
| 4,500,818 | 2/1985 | Konrad et al. . |
| 4,629,043 | 12/1986 | Matsuo et al. ........................... 192/4 A |
| 4,667,471 | 5/1987 | Fulmer et al. ............................ 60/545 |
| 4,686,872 | 8/1987 | Aoki et al. ................................ 477/114 |
| 4,717,207 | 1/1988 | Kubota et al. .............................. 303/3 |
| 4,885,698 | 12/1989 | Kawasaki . |
| 4,896,090 | 1/1990 | Balch et al. . |
| 5,129,496 | 7/1992 | Sigl et al. ................................. 192/49 |
| 5,367,461 | 11/1994 | Matsuda et al. . |
| 5,376,868 | 12/1994 | Toyoda et al. . |
| 5,376,869 | 12/1994 | Konrad .................................... 318/587 |
| 5,388,658 | 2/1995 | Ando et al. . |
| 5,457,633 | 10/1995 | Palmer et al. . |
| 5,484,044 | 1/1996 | Bursteinas et al. ...................... 188/353 |
| 5,537,011 | 7/1996 | Bachman et al. . |
| 5,646,510 | 7/1997 | Kumar . |
| 5,707,115 | 1/1998 | Bodie et al. ................................ 303/3 |
| 5,708,332 | 1/1998 | Bottger et al. . |
| 5,841,254 | 11/1998 | Balch et al. . |
| 5,847,534 | 12/1998 | Tanamachi et al. . |
| 5,916,062 | 6/1999 | Siepker .................................... 477/194 |

*Primary Examiner*—Brian Sircus
*Attorney, Agent, or Firm*—Carl A. Rowold; Ann M. Agosti; David R. Risley

[57] ABSTRACT

Torque is distributed by calculating first and second torque commands using a requested torque and a ratio of speeds of first and second wheels and limiting them in accordance with respective torque command approved ranges and approved change rates; converting the limited torque commands to horsepower commands and limiting them in accordance with respective horsepower command approved ranges and approved change rates; and converting the limited horsepower commands to present torque commands. Maximum horsepower available is determined by using an engine speed to determine a nominal amount of available horsepower; applying a desired load status signal and an actual engine load status signal to a proportional-integral A regulator; and using the nominal amount of available horsepower and an output signal of the regulator to determine the maximum amount of available horsepower. Thermal protection is provided by obtaining component temperatures of a plurality of components; normalizing each component temperature; obtaining a normalized drive system temperature by determining a maximum value of the normalized component temperatures; and comparing the normalized drive system temperature with at least one predetermined maximum normalized temperature and using a result of the comparison to determine whether a corrective action is needed. A truck is started on an incline by determining whether its speed is below a predetermined speed limit, a service brake is applied, and an accelerator pedal is depressed, and, if so, permitting a propulsion torque to build without requiring an operator override action.

9 Claims, 6 Drawing Sheets

AC MOTORIZED WHEEL CONTROL SYSTEM

This application is a division of application Ser. No. 08/923,484, filed Sep. 4, 1997 which is hereby incorporated by reference in its entirety.

BACKGROUND OF THE INVENTION

The present invention relates generally to controls for drive systems including AC motorized wheels. The present invention relates more particularly to torque distribution, engine loading, temperature warnings, and hill starting controls for haul trucks having drive systems including AC motorized wheels.

Electric drive systems for haul trucks typically provide the same torque to both rear wheels under all moving conditions. In some DC electric drive systems, a foot pedal is mapped to engine speed which is related to horsepower in a nonlinear fashion. Conventionally, an engine load curve is a curve relating available engine horsepower to engine speed and is generalized for a nominal engine in nominal conditions. These drive systems regulate engine speed to the full load speed by adjusting the horsepower load only at steady state full throttle. For partial throttle applications, the horsepower load is less than the optimal value to reserve engine power in case it is needed to accelerate the engine to full speed.

Conventional temperature warning indicators on electric drive haul trucks include warning lights for motor temperatures which exceed predetermined limits. These temperature indicators generally must compromise between including either (1) a large number of temperature readings which an operator may not have time or ability to interpret or (2) a small number of readings which may not include some important areas of the drive system such as the alternator or the exciter.

Electric drive haul trucks generally have retarding effort provided by the electric motors and service brakes which use friction to stop the haul truck. A single foot pedal is used to request retarder effort and service brakes with the first half of the pedal travel controlling retarder effort and the second half of the pedal travel controlling friction brakes. The friction brakes may also be activated by use of a dash mounted switch which requests full braking effort. The drive system recognizes pressure in the friction brake lines as a request for full retarder effort. When the drive system recognizes a retarder request, it prevents propulsion effort even if the vehicle speed is below the speed at which the retarder can operate (in one embodiment, for example, the retarder can only operate at speeds above one mile per hour). Haul trucks frequently have to start from a stopped position on steep uphill grades (grades greater than or equal to about eight percent) with a full load. If an operator releases the friction brakes before the drive system has developed enough torque to balance the weight of the truck on the grade, the truck will roll backwards. During hill starts, friction brakes are used while the system is building torque to prevent the truck from rolling backwards and operators are required to depress an override button to allow the system to propel against the friction brakes.

SUMMARY OF THE INVENTION

Thus there is a particular need for an AC electric drive system which provides more torque in partial throttle conditions during a turn to an outside rear wheel than the inside rear wheel in order to minimize tire wear and turning radius; which provides control over the rate of torque change to provide a smooth and controllable truck; and which provides control of the horsepower load on the engine to prevent the engine bogging down due to an overload. In one embodiment, the torque is distributed in proportion to the left and right wheel speeds after being limited in the event that right or left wheel motor torque, right or left wheel motor rate of torque change, total horsepower, or rate of total horsepower change would exceed its respective limit. Torque and torque rate limits are useful for providing a smooth, controllable vehicle with minimized peak values (since high torque contributes to gear wear), and horsepower rate limits are useful because the engine and alternator are limited in how fast they can change horsepower levels.

It would further be advantageous to have a drive system providing direct driver control of propulsion horsepower; optimal steady state loading of the engine during climatic, fuel quality, and engine condition variations over the complete engine speed range; and optimal load control during engine acceleration transient operation (to allow the drive system to reduce power transiently to decrease the time to full speed and full horsepower). In one embodiment, an input from an accelerator pedal is mapped through a shaping function directly to propulsion torque and horsepower instead of to an engine speed command and thus provides good driver control of the propulsion effort. The actual commanded horsepower is modified (based on a load signal from the engine and a nominal amount of horsepower calculated using a sensed engine speed) to a value which allows the drive system to optimally load the engine over the complete speed range. Additionally, this method permits the drive system to reduce the horsepower load while the engine is accelerating to reduce the time required to reach full horsepower.

There is also a need for an electric drive haul truck control system including a comprehensive thermal self protection system with simplified operator warning lights. In one embodiment of the present invention, the thermal self protection system represents the thermal state of the drive system as a single temperature instead of as a plurality of separate temperatures. The system minimizes the required training of operators and provides operators with a concise display of the thermal state of the drive system.

It would be advantageous to further simplify haul truck driver tasks and training by permitting an operator to smoothly start on a hill without requiring the operator to hold down an override or reset button. The present invention interprets the natural sequence of driver actions during hill start situations to determine that a hill start exists and permits the driver to perform a hill start without pressing additional buttons or performing difficult sequences of steps.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION OF PREFERRED EMBODIMENTS OF THE INVENTION

TORQUE DISTRIBUTION

Figure 1:
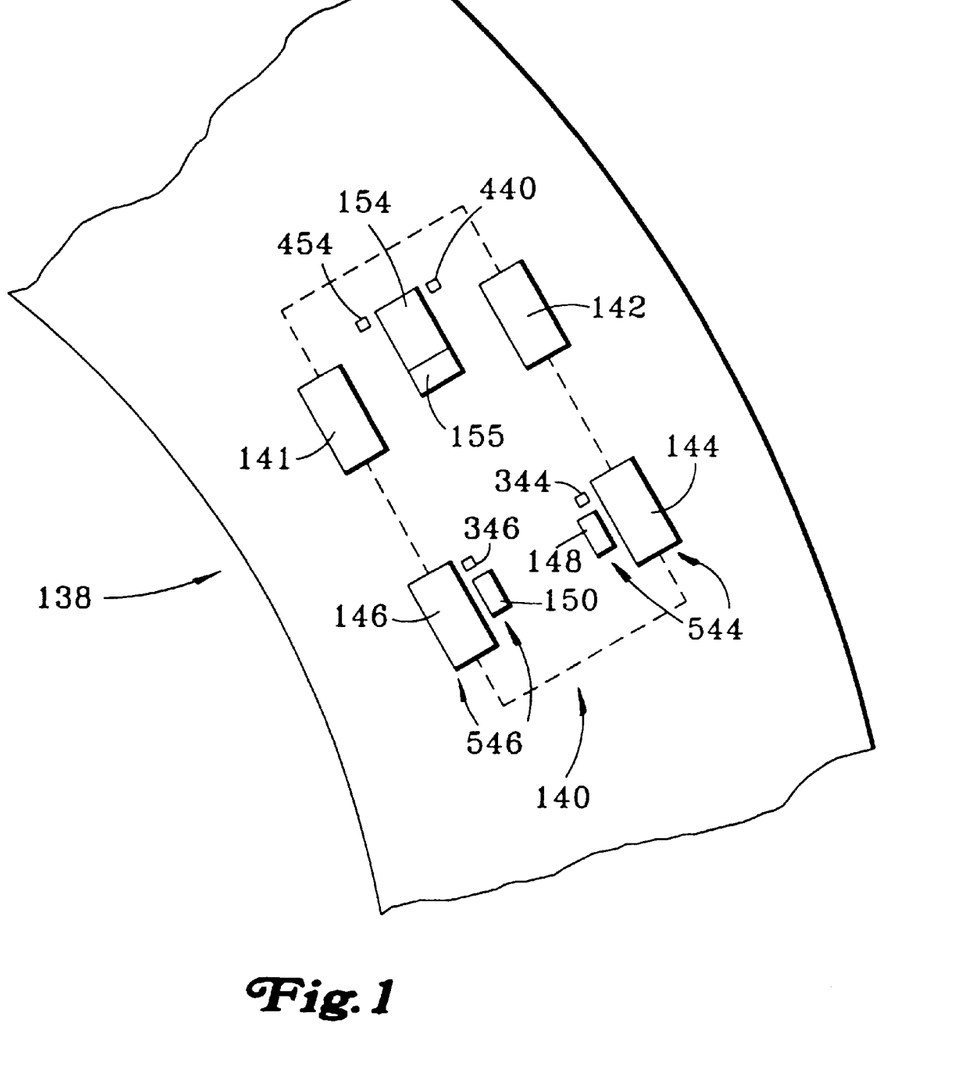
FIG. 1 is a block diagram of a curved road and a truck including front wheels, left and right rear wheels, and left and right wheel motors.
Figure 2:
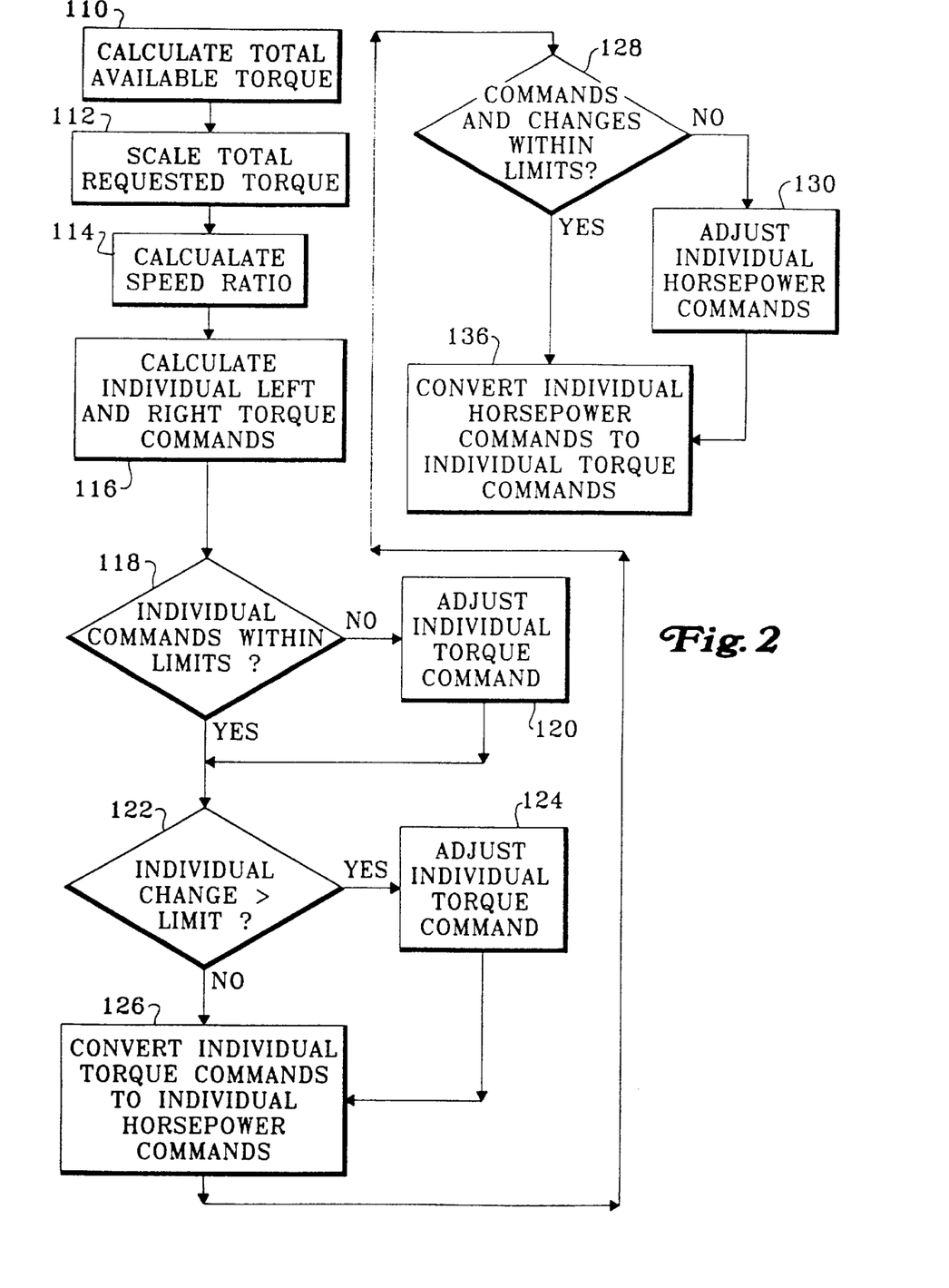
FIG. 2 is a flow chart of a method of the present invention for distributing torque between the left and right wheel motors.

FIG. 1 is a block diagram of a curved road 138 and a truck 140 including a right front wheel 142, a left front wheel 141, a right rear wheel 144, a left rear wheel 146, a right wheel motor 148, and a left wheel motor 150, and FIG. 2 is a flow chart of a method of the present invention for distributing torque between the left and right wheel motors. A first motorized wheel 546 includes wheel 146 and wheel motor 150, and a second motorized wheel 544 includes wheel 144 and wheel motor 148.

In step 110, the total available torque (tlimit_total_max) is obtained by obtaining the sum of the maximum available torque on each wheel motor (tlimit_motor1_max+tlimit_motor2_max).

The torque available from each wheel motor is based on its respective speed. A computer can include software having a linear interpolation table to look up the available maximum torque for each wheel motor based on the speed of that individual wheel motor. The general slope of a curve useful in creating such tables uses two limits: (1) the available maximum torque must be below a predetermined level x, and (2) the horsepower (which depends on the speed) must be below a predetermined level y.

The relation between horsepower and speed is as follows:

$$\text{horsepower}=(tq*\text{speed})/m$$

wherein tq represents torque and m represents a constant (which in one embodiment wherein the torque is in lb.-ft and the speed is in rpm equals 5252). The curve is flat at level x from a speed of zero rpm to a predetermined speed (which in one embodiment is 286.6 rpm), and the curve decreases by a factor of 1/speed above the predetermined speed to remain within a constant horsepower limit.

Figure 6:
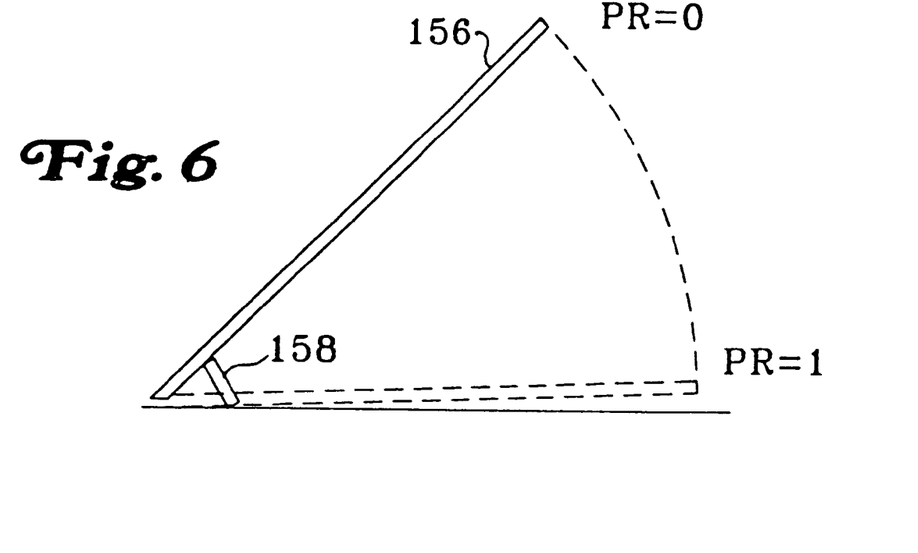
FIGS. 6, 7, and 8 are side diagrams of foot pedals and a switch.

In step 112, a requested torque is scaled. In one embodiment, an operator (driver) requests torque by applying pressure to a pedal 156 (shown in FIG. 6) which has positions mapped between 0 and 1. The maximum total available torque is then multiplied by the mapped requested torque position to provide a scaled total requested torque.

In one embodiment, the mapped requested torque position from the accelerator pedal is further used as a mapped requested horsepower position to request engine speed. In this embodiment, the mapped requested horsepower position can be multiplied by the full load horsepower value (which in one embodiment is 2500 horsepower) to obtain commanded horsepower. The commanded horsepower can be used with an engine load curve (a graph of the horsepower the drive system should use from the engine versus speed) to determine an appropriate engine speed command that could generate the commanded horsepower.

In step 114, a speed ratio between the left to right rear wheel speeds is calculated. When a vehicle is turning, the left and right front wheel speeds are not the same, but a ratio of these speeds is not needed for use in the present invention. The left and right rear wheel speeds (hereinafter referred to as the left and right wheel speeds) can be obtained by conventional speed sensors 344 and 346 such as tooth gears with active quadrature tachometers which sense changes in reluctance.

In step 116, the speed ratio is used to calculate individual left and right torque commands (tqx_call1_now and tqx_call2_now) by distributing the scaled total requested torque among the left and right torque commands in proportion to the speed ratio between the left and right torque commands.

In step 118, it is determined whether either of the first and second torque commands fall outside their respective first and second torque command approved ranges, and, if so, in step 120, the appropriate individual torque command is adjusted.

If either the left or right wheel motor torque limit (tlimit_motor1_max, tlimit_motor2_max) is exceeded by a respective left or right torque command, the torque for that motor will be set to its limit and the torque to the other motor will be increased by the amount the opposite wheel motor exceeds its torque limit (up to its own limit).

The present invention provides more torque to the outside wheel at part throttle than prior techniques where the torque was evenly distributed. The outside wheel will have a lower torque limit than the inside wheel because it is turning faster. As throttle increases from zero and the speed ratio is held constant, torque is distributed based on the speed ratio. As torque increases and reaches the outside wheel limit, the outside wheel torque command is held constant and only the inside wheel torque is increased, eventually exceeding the outside wheel torque.

Both motor torques should be limited to be above a minimum value based on their respective motor speeds. Generally, motor torque will be at a flat torque level (flat_torquelevel) up to a predetermined motor speed (ramp_speed), and the motor torque will ramp down as the motor speed (motor_speed_rpm) increases above the ramp_speed by a factor of 1/motor_speed_rpm. For motor speeds less than ramp_speed, the minimum torque is flat_torquelevel. For motor speeds above the ramp_speed and below a minimum torque level, the following equation can be used:

$$(\text{ramp\_speed}/\text{motor\_speed\_rpm})*\text{flat\_torquelevel}$$

In one embodiment, flat_torquelevel=750 lb.-ft, ramp_speed=500 rpm, and the minimum torque level=50 lb.-ft. The invention thus permits the system to provide the desired torque split at part throttle applications and still apply full propulsion effort at full throttle.

After the left and right torque commands are calculated (and, if necessary, adjusted), at step 122 it is determined whether the difference between the requested torque for the right (or left) wheel motor and the torque command for the right (or left) wheel of the previous cycle is greater than a predetermined rate limit.

The rate limit between the present and previous torque commands is a function of torque and the mode of the truck. In one embodiment, for example, the increasing rate limit is 9000 lb.-ft/sec when the last torque command is less than 8000 lb.-ft, and the rate limit decreases to 2500 lb.-ft/sec when the last torque command is greater than 8000 lb.-ft. Typically, the truck does not require torques near the maximum torque (about 19000 lb.-ft in one embodiment) to begin moving. A slower rate of torque change allows the truck to start moving and then ride the engine horsepower limit before the torque reaches its maximum value. This method provides a smooth ride and minimizes wear on the gears.

The decreasing rate limit is set by the mode of the trucks and depends on whether the truck is exiting propulsion to enter retard versus reducing propulsion effort. In one embodiment, for example, when exiting propulsion to enter retard the rate limit is set to −20,000 lb.-ft/second, and when reducing normal propulsion effort the rate limit is set to −100,000 lb.-ft/second.

If a requested torque command for the left or right wheel motor exceeds the limit, the assigned torque command is set to the previous cycle command plus the rate limit at step 124. If the other torque command does not exceed the rate limit, its wheel motor torque command is not further adjusted.

At step 126, the resulting left and right wheel motor torque commands are converted to horsepower commands, and at step 128, it is determined whether the horsepower commands are within predetermined limits.

Total maximum and minimum horsepower limits (hp_max and hp_min) can be calculated as follows:

$$hp\_max\ \text{minimum}\ (hp\_old+rate\_limit\_max,\ hp\_available)$$
$$hp\_min=hp\_old-rate\_limit\_min$$

wherein: hp_available=horsepower available from engine 154, hp_old=the sum of the last iteration torque commands converted to horsepower values, rate_limit_max=the limit to the rate of horsepower change for increasing propulsion horsepower, and rate_limit_min=the limit to the rate of horsepower change for decreasing propulsion horsepower. In one embodiment, for example, rate_limit_max=500 horsepower/second, and rate_limit_min changes according to the mode of the system as follows: 100,000 horsepower/second if exiting propulsion to enter a retard, 20,000 horsepower/second if exiting propulsion because of a fault condition, and 4,500 horsepower/second for other reasons for exiting propulsion or decreasing horsepower.

Next, a horsepower ratio for the motors can be calculated with the following equations:

$$hp\_ratio=1/(1+temp)$$
$$temp=(m2speed/m1speed)*((1-tq\_ratio)/tq\_ratio)$$
$$tq\_ratio=tq1\_call\_old/(tq1\_call\_old+tq2\_call\_old)$$

wherein m1speed=the speed of motor 1, m2speed=the speed of motor 2, tq1_call_old=the torque call for motor 1 from the last iteration, tq2_call_old =the torque call for the motor 2 from the last iteration, and hp_ratio (which ranges from 0 to 1) represents the percentage of horsepower which should be applied to motor 1.

Then horsepower maximums and minimums for the two wheel motors can be calculated as follows:

$$hplimit\_motor1\_up=hp\_max*hp\_ratio$$
$$hplimit\_motor1\_dn=hp\_min*hp\_ratio$$
$$hplimit\_motor2\_up=hp\_max*(1-hp\_ratio)$$
$$hplimit\_motor2\_dn=hp\_min*(1-hp\_ratio).$$

The hp_call for motor 1 is limited between hplimit_motor1_up and hplimit_motor1_dn, and the hp_call for motor 2 is limited between hplimit_motor2_up and hplimit_motor2_dn. If either horsepower command is not within its predetermined limits, at step 130, the individual horsepower command is adjusted to be the upper limit if it exceeds the range or the lower limit if it falls below the range.

Thus the maximum total horsepower will be limited to hplimit_motor1_up +hplimit_motor2_up, and the minimum total horsepower will be hplimit_motor1_dn+ hplimit_motor2_dn. Because of the manner in which the torque ratio is used in the above equations, the total horsepower rate of change will also remain within acceptable limits. As shown by the above equations, the calculation to determine the rate of change limit includes determining the horsepower ratio (split) between the two wheel motors which would match the torque split from the last iteration and then determines what an acceptable change in horsepower is for each wheel assuming the torque split is the same.

At step 136, the horsepower commands are converted to torque commands which are sent to an inverter controller.

The engine controller 155 is typically provided by the manufacturer of engine 154 and has a location on the vehicle that is dependent on the type of engine. Common positions for engine controllers are on the engine or in an auxiliary cabinet near the drive system controller.

Figure 3:
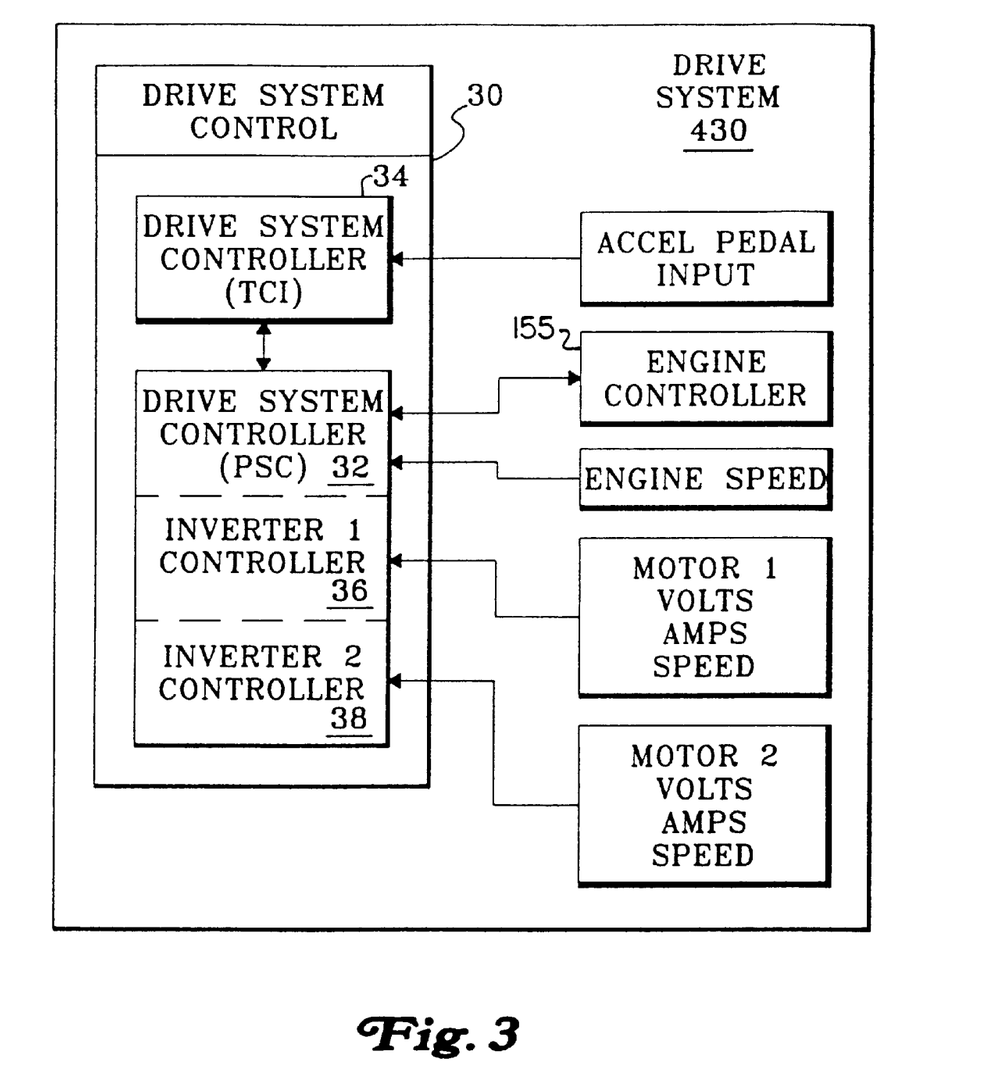
FIG. 3 is a block diagram of a drive system control and its input signals.

FIG. 3 is a block diagram of one embodiment, for example, of a drive system 430 including a drive system controller 30 and its input signals. In FIG. 3, the drive system controller includes two separate computers which can exchange data. One computer 32 includes the propulsion system controls (PSC) and is situated in a main cabinet. Signals supplied to this computer include a signal from the engine controller and an engine speed signal. The other drive system computer 34 is the truck control interface (TCI) computer which is located in an auxiliary cabinet. This computer receives signals from the acceleration pedal and supplies signals to a temperature gauge. Each inverter controller may comprise a separate computer 36 and 38 for receiving volt, amp, and speed data from a respective motor. If a more powerful computer were used, two or more of these computers could be combined.

By calculating individual torque commands for the left and right wheels, the present invention provides more torque to the outside wheel when possible and prevents violations of the following limits: the total horsepower limit of the engine and the rest of the drive system, the total horsepower rate of change limit of the engine and the rest of the drive system, individual motor torque limitations, and individual motor torque rate of change limitations and thus minimizes front tire wear, minimizes turning radiuses, and provides controllable propulsion and horsepower load.

ENGINE LOADING

Figure 4:
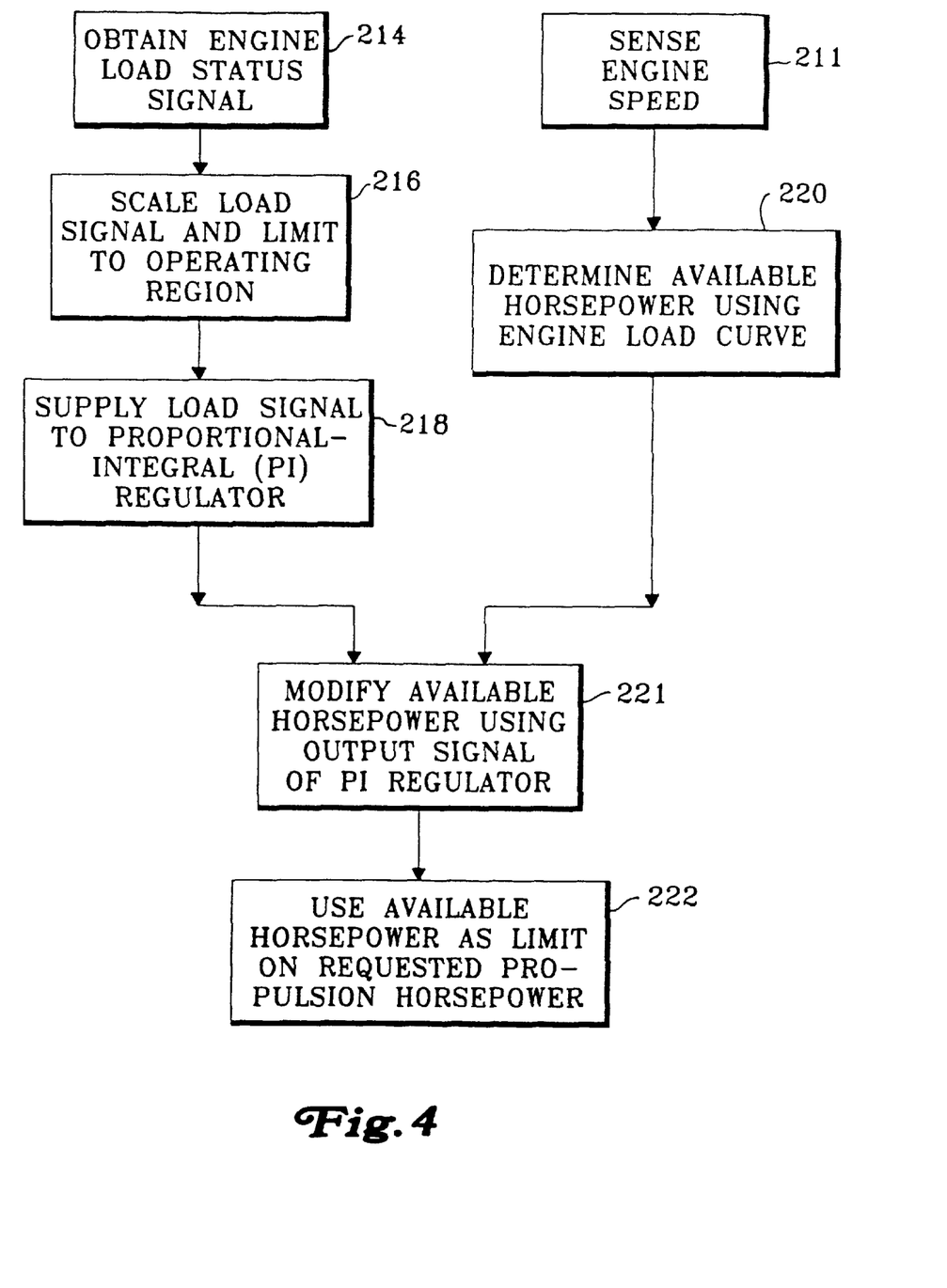
FIG. 4 is a flow chart of a method of the present invention for optimal engine loading.

FIG. 4 is a flowchart for optimal engine loading for an AC wheel drive system. At step 211, an engine speed is sensed with an engine speed sensor 454 (shown in FIG. 1), and at step 220, an amount of nominal available horsepower can be determined using an engine load curve which is a graph of the horsepower the drive system should use from the engine versus speed.

At step 214, an engine load status signal is obtained. In one embodiment, the engine load status signal is a continuous analog signal from zero to ten volts created by an engine controller 156 which indicates whether the engine 154 is underloaded or overloaded. A drive system controller 30 (shown in FIG. 3) reads the analog engine load status signal after it is converted to a digital signal with an analog to digital converter (not shown).

At step 216, the load status signal is scaled and limited to an appropriate operating region. The determination of the operating region is based on specific detailed characteristics about the signal which can be obtained from the engine manufacturer.

There may be different limits depending on the particular engine and the way in which it generates load signals. For example, for engines from some engine manufacturers, it is useful to ignore load signals at low engine speeds (such as below 900 rpm, for example), while engines from other manufacturers may not have this limitation.

It is advantageous to permit the operator to be able command low levels of torque by limiting the positive value of the engine load signal based on pedal position. The limit can be computed with a 2 point table, for example wherein (1) engine load is limited to be less than five volts when the pedal is depressed less than fifty percent of its range of motion, and (2) engine load limit is permitted to increase from 5 to 10 as the pedal range increases from fifty percent to eighty percent. In this example, engine load is not limited when the pedal is pressed beyond eighty percent.

At step 218, the scaled and limited load signal is used as an error signal input to a PI (proportional-integral) regulator with negative feedback on the integrator. A PI regulator is a computer algorithm having an error signal input which is typically a set point signal (often the desired signal) minus a feedback signal (often the actual signal) and an output signal which is used to adjust some aspect of the system to keep the error signal at zero. In the present invention, the engine load signal is used as the error signal.

In the AC Wheel application of the present invention, the output of the PI is a hp_adjust signal which adjusts the horsepower load of the drive system on the engine. The PI regulator can adjust the drive system horsepower to keep the engine load signal at the desired value (which in one embodiment is about five volts).

The PI regulator output is the sum of a constant (Kp) times the error plus the integral of a constant (Ki) times the error. The equation is:

$$\text{output}=Kp*\text{error}+\text{Integral}(Ki*\text{error})$$

In one embodiment wherein 5 volts is the desired value, the error is the load signal−5. The constants Kp and Ki are set by experimentation or, if engine characteristics are available, can be calculated based on engine characteristics.

Negative feedback is not typically present in PI regulators. In the present invention, negative feedback (out_I) affects the integral portion of the equation as follows by modifying the PI equation:

$$\text{output}=Kp*\text{error}+\text{Integral}(Ki*\text{error}-Knf*\text{out\_i})$$

wherein Knf represents the negative feedback. Knf can be selected mathematically by calculating how much steady state error would be acceptable to maintaining full reductions or additions of horsepower and determining a time within which the integrator should reset. Using the negative feedback in this manner resets the state of the integrator when it is not closing the loop.

Anti-windup limits the regulator action based on real limits of the system. A regulator only works properly when its output is actually affecting the feedback it measures. Anti-windup is a standard part of PI regulators, and there are many different implementation schemes. Conventional anti-windup can be used with logic of the present invention to turn off the integrator whenever the final torque command to the inverters does not reflect changes in hp_adjust.

A PI regulator is a type of closed loop controller in that the system looks at a feedback (an actual signal) to calculate a command in order to achieve a goal of holding the feedback at a specific value. Hence, the controller is closing a loop. In the present invention, the integral term can be turned off when the controller is not closing the loop due to other system limitations controlling the amount of horsepower used.

At step 221, the output signal of the PI regulator from step 218 is used as an offset to the nominal available horsepower found by step 220 to determine the maximum horsepower available from the engine. For example if engine has 1810 nominal horsepower available at 1700 rpm and it is a hot day, the engine may be derating and actually only have 1750 horsepower available. Thus if the drive system used 1810 horsepower it would drag down engine speed, possibly until it stalls. The engine load signal provides information to the drive system the engine is overloaded (the voltage is <5 volts) This is a negative error because the set point is 5 volts. The PI turns this negative error into a negative value which becomes more negative with time as the voltage stays less than five volts.

For example, assume there is −40 horsepower as the output of the PI (an hp_adjust signal). The drive system adds the hp_adjust (−40 horsepower) to the nominal 1810 horsepower the load curve says is available, and thus the drive system believes that only a maximum of 1770 horsepower is available. In the present example, after the adjustment of −40 horsepower, the engine would still be overloaded and keep the load signal less than 5 volts until the PI output integrates down to −60 horsepower at which point the drive system load and engine output match, and the engine load signal will then read 5 volts.

At step 222, the maximum amount of horsepower available is used as a limit on a commanded propulsion horsepower. If the engine loading method of FIG. 4 is used in combination with the torque distribution method discussed with respect to FIG. 2, the maximum amount of horsepower available can be used by the algorithm in the torque control invention to limit the horsepower command in step 128 of FIG. 2.

Thus, this method accomplishes optimal loading over the complete speed range at steady state based on variations during acceleration by reducing load (power) to reduce the time required to reach full horsepower and full speed. There are three basic types of horsepower versus speed curves: (1) the WOT (Wide Open Throttle) line which defines the absolute maximum horsepower the engine can generate; (2) the optimal line defining the ideal horsepower the drive system should be using from the engine versus speed (at speeds less than full speed, it is usually chosen for maximum efficiency, and at full speed it comes very close to or matches the WOT line); and (3) the drive system load curve which is the amount of power the drive system should use versus engine speed for steady state on a nominal engine.

As the driver increases the accelerator pedal from 0% to 100% the engine speed increases and the drive system uses horsepower based on the drive system load curve. If the load signal and horsepower adjust of the present invention are not used, then the horsepower used to accelerate the engine would be the WOT value minus the load curve value. In order to get fast response from the engine (fast acceleration to full engine speed) the load curve would be significantly lower than the WOT curve, and for most engines this would also make it lower than the optimal curve. Thus if the operator were intentionally driving at 50% accelerator pedal—the engine would not be at optimal load.

With the load signal embodiment of the present invention, the load curve can be set closer to the optimal curve line. If the engine is trying to accelerate, it would indicate overload conditions and the drive system would decrease load and allow the engine to accelerate faster.

Furthermore, at steady state operation the load signal allows the drive system to adjust the horsepower used to match exactly what the engine can do in the present conditions, not a nominal engine in nominal conditions as is represented by a nominal load horsepower curve.

THERMAL CONTROL

Figure 5:
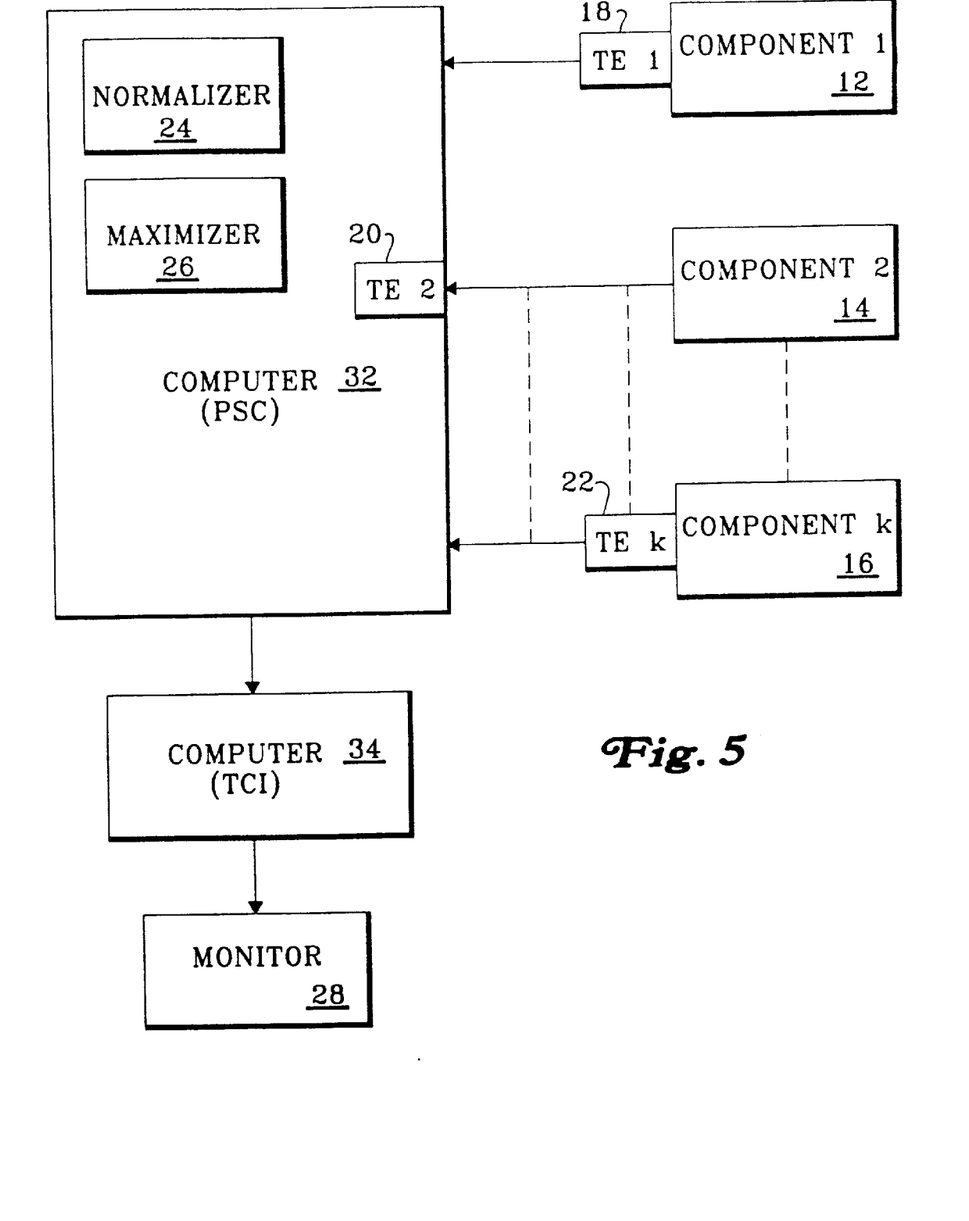
FIG. 5 is a block diagram of a thermal control system of the present invention.

FIG. 5 is a block diagram of a thermal control system of the present invention including a computer 32 and a plurality (k) of components (shown as components 12, 14, and 16). The components represent different components of thermal interest in a drive system. In one embodiment, for example, there are fourteen components (not shown) which include an auxiliary blower control phase controller, an auxiliary blower control inverter, an alternator static exciter, an alternator field, left and right motor stators, left and right motor rotors, a dynamic braking chopper GTO, a dynamic braking chopper diode, left and right inverter phase module GTOs, and left and right inverter phase module diodes.

A plurality (k) of temperature estimators (shown as 18, 20, and 22) can be use to sense and/or use information to obtain component temperatures. These temperature estimators can either sense temperatures directly or can calculate temperatures based on conventional mathematical device models using various measured characteristics. For example, an alternator field temperature model can use field current, engine rpm, ambient temperature, and barometric pressure to estimate temperature. Although estimators 18 and 22 are shown adjacent the components in FIG. 5, some of the estimators such as estimator 20 which do not sense temperature directly, can be included in computer 32. The estimators which compute temperature instead of directly measuring it may use sensed parameters of the component itself as well as parameters obtained from other sources.

For each component a respective warning temperature (Twarning) and a respective shutdown temperature (Tshutdown) is defined. The computer receives temperatures from each of the estimators. The computer includes a normalizer 24 which interpolates each temperature between the ambient temperature, its respective Twarning, and its respective Tshutdown to provide an equivalent temperature on a normalized scale. The normalized scale has a normalized warning temperature (NTwarning) and a normalized shutdown temperature (NTshutdown).

The computer further includes a maximizer 26 which then determines the maximum value of all the normallized temperatures at any given time and defines the drive system temperature to be that maximum value. The drive system temperature can be displayed on a monitor 28 for use by an operator. Although in the example of FIG. 5, an interface computer 34 receives information from the propulsion system controlling computer 32 for delivery to monitor 28, such an interface computer is not a necessary element of the present invention.

EXAMPLE OF NORMALIZATION CALCULATIONS

In one embodiment, the following warning and shutdown temperatures are used

Twarning for GTO=105° C.
Tshutdown for GTO=115° C.
normalized ambient temperature (NTambient)=0° C.
NTwarning=60° C.
NTshutdown=85° C.

In this embodiment, as the drive system ambient temperature (Atemperature) changes, the normalization will change for GTO temperatures (Ctemperature) less than 105° C. If the GTO temperature is less than the GTO Twarning, then the normalized GTO temperature (Ntemperature) can be calculated as follows:

$$Ntemperature = \frac{Ctemperature - Atemperature}{Twarning - Atemperature} * NTwarning$$

Thus, if the ambient temperature is 45° C., and if the GTO temperature is 75° C., the normalized temperature would be $$\frac{75 - 45}{105 - 45} * 60 = 30.$$

Similarly, if the ambient temperature drops to 15° C., and the GTO temperature is 75° C., the normalized temperature would increase to $$\frac{75 - 15}{105 - 15} * 60 = 40.$$

Drive system ambient changes do not affect the normalization for component temperatures at or above their respective warning temperature. In these situations, Ntemperature can be calculated as follows:

$$Ntemperature = Nwarning + \frac{Ctemperature - Twarning}{Tshutdown - Twarning} * (Nshutdown - Nwarning)$$

For example, if the ambient is 45° C. and the GTO temperature is 110° C., the normalized temperature would be $$60 + \frac{110 - 105}{115 - 105} * (85 - 60) = 72.5.$$

If the GTO temperature is 120° C. (which is above the shutdown temperature), the above formula would apply and the normalized temperature would be $$60 + \frac{120 - 105}{115 - 105} * (85 - 60) = 97.5.$$

In one embodiment, the normalized temperature has an upper limit of 100° C. The values used as normallized warning, shutdown, and optional upper limit temperatures are not significant and can be selected based on safe, warning, and shutdown zone deflection percentages of the monitor.

As stated above, the present invention has an advantage of providing a single temperature rather than a large number of separate temperatures. Thus, monitor 28 may comprise a single gauge which can show the single temperature and/or a sequence of warning lights representative of that temperature.

For example, if the highest normalized temperature is greater than or equal to the normallized shutdown temperature, a red light can be used. Similarly, a yellow light can be used if the highest normallized temperature is between the normallized warning and shutdown temperatures, and a green light (or, if preferred, no light) can be used for highest normallized temperatures falling below the normallized warning temperature.

If the operator sees a temperature number or a colored light, the operator can take corrective action before the thermal limit when operation is restricted. Operator training can teach the operator about proper reactions to various temperature warnings. Additionally, if desired, the monitor can display instructions to the operator.

The computer can send instructions to a drive system controller 30 (which may be a separate microprocessor or a portion of a microprocessor shared with the computer). For example, if a normalized shutdown temperature is exceeded, the computer would inhibit the drive system propulsion effort while permitting its retarding effort.

If a normallized warning temperature is exceeded during propulsion (but the normallized shutdown temperature is not), an operator can observe how fast the temperature is rising and determine whether the truck can reach the top of the hill before the normallized shutdown temperature is reached. If the truck cannot, the driver can stop the truck at a safe location (i.e. not in a switchback turn) and let the system cool down. During a retarding effort, the operator can reduce truck speed (by using the friction brakes) to generate less horsepower with the retarding system while maintaining speed and lower the temperatures. The drive system will continue to provide retarding effort as long as possible.

In one embodiment, the computer provides instructions to the drive system to automatically reduce the retard effort at a predetermined number of normalized degrees (5 for example) below the normallized warning temperature to a level at which the system is continuously rated (that is, a level at which the system should be able to run indefinitely without overheating at an ambient temperature of 55° C.). If the ambient temperature is below this level, the drive system can provide significantly more retard effort and thus allow the operators to retard down the hills at higher speeds in cooler whether.

HILL STARTS

Figure 7:
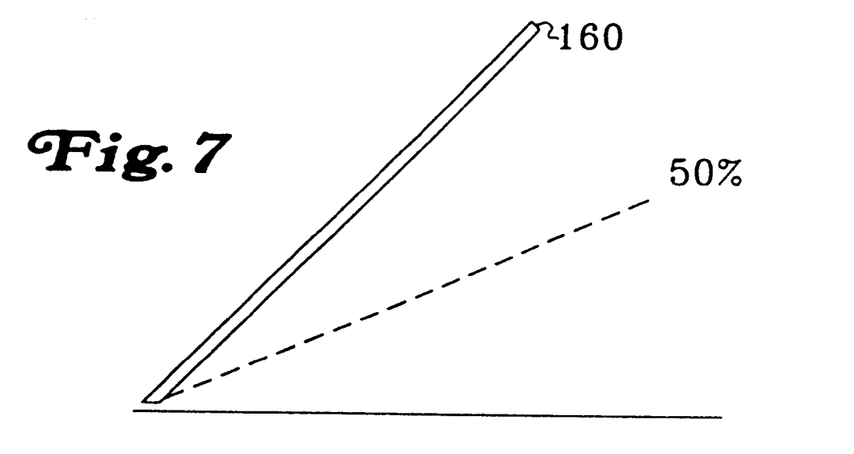

In the present invention, a computer is used to monitor three variables (1) truck speed (as obtained from a truck speed sensor 440 (shown in FIG. 1) which obtains an average of the speeds of the truck's four wheels), (2) accelerator pedal application; and (3) friction brake application. In some embodiments, the brake application will be by a pedal 160 (shown in FIG. 7), and in other embodiments the brake application will be by a switch 162 (shown in FIG. 8).

If friction brake application is controlled by a pedal and the truck speed is less than a predetermined limit, then the computer looks for a sequence of the driver (1) applying the service brake with his left foot, and (2) depressing the accelerator pedal 156 (shown in FIG. 6) with his right foot. In this situation, the computer interprets these actions as a hill start and permits the propulsion torque to build. The operator can then slowly release the service brake while propulsion torque builds.

Figure 8:
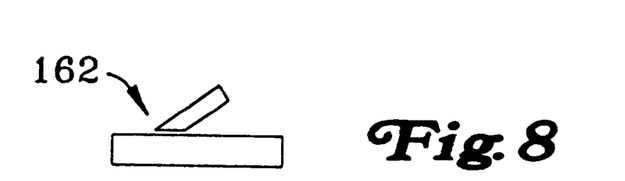

If the brake application is controlled by a switch and the truck speed is less than a predetermined limit, then the computer looks for a sequence of the driver (1) applying the service brake switch and (2) depressing the accelerator. Again, the computer interprets these actions as a hill start and permits the propulsion torque to build. The operator can release the service brake when the operator believes drive system has enough torque to propel the vehicle up the hill.

The determination of the predetermined truck speed limit for this analysis preferably applies hysteresis. In one embodiment, for example, if the truck has been moving at a speed above one mile per hour, the truck's speed must be reduced to below 0.3 miles per hour to be "less than a predetermined limit." If the truck has not been moving, then the truck remains "less than a predetermined limit" until it reaches a speed of one mile per hour.

In the present invention, the drive system continues to ignore retarder requests from the foot brake pedal and service brake pressure switch as long as the truck speed remains below a second predetermined speed limit (above the first predetermined speed limit used to initially permit propulsion torque to build) which, in one embodiment, is five miles per hour. This allows the operator to request propulsion effort by depressing the accelerator pedal and thus drive through the friction brakes without additionally holding down an operator reset button. When the service brake is controlled by the foot pedal, this method allows the driver to perform a smooth hill start by driving with one foot on the brake and one foot on the gas and gradually releasing the brake as the driver feels the drive system producing enough torque to keep the truck from rolling backwards.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method of propelling an electromotive vehicle up an incline, the vehicle having wheels, motors at the wheels for propelling the vehicle and for selectively functioning as electric power generators for generating electrical power for retarding travel of the vehicle, a brake control for applying both an electric retarding action as electric power is generated at the wheels and a mechanical friction braking action, and an acceleration control for delivering electric power to the motors at the wheels to develop torque for propelling the vehicle, the method comprising:

sensing the speed of the vehicle;

determining if the speed of the vehicle is below a first predetermined speed limit;

activating the brake control;

activating the acceleration control; and automatically disabling the electric retarding action while retaining the mechanical friction braking action if the speed of the vehicle is below the first predetermined speed and if the brake control and acceleration control are both activated during the same time period, wherein propulsion torque is built at the motors to hold the vehicle on the incline without requiring operator override action.

2. The method of claim 1, further comprising continuing to disable the electric retarding action until the speed of the vehicle reaches a second predetermined speed limit greater than the first.

3. The method of claim 1, wherein the brake control is actuated first and then the acceleration control.

4. A system for propelling an electro-motive vehicle up an incline, the vehicle comprising:

wheels;

motors at the wheels which propel the vehicle and selectively function as electric power generators for generating electric power for retarding travel of the vehicle;

a brake control which applies both an electric dynamic retarding action as electric power is generated at the wheels and a mechanical friction braking action;

an acceleration control which delivers electric power to the motors at the wheels to develop torque for propelling the vehicle;

a speed sensor which senses the speed of the vehicle; and a processor which disables the electric retarding action while retaining the mechanical friction braking action if the speed of the vehicle is below a first predetermined speed limit and the brake control and acceleration control are both activated during the same time period for enabling propulsion torque to build to hold the vehicle on the incline without requiring operator override action.

5. The system of claim 4, wherein the brake control is a brake pedal having a first position controlling only the electric retarding action and a second position controlling both the electric retarding action and the mechanical friction braking action.

6. The system of claim 4, wherein the brake control is a brake switch controlling both the electric retarding action and mechanical friction braking action.

7. The system of claim 4, wherein the processor is a computer on the vehicle.

8. The system of claim 4, wherein the processor returns control of the electric retarding action to the brake control when the speed of the vehicle exceeds a second predetermined speed limit greater than the first.

9. The system of claim 4, wherein the speed sensor is in communication with the processor and sends speed data to the processor.

* * * * *